United States Patent
Gong et al.

(10) Patent No.: US 9,030,981 B2
(45) Date of Patent: *May 12, 2015

(54) DEVICE POWER MANAGEMENT IN A WIRELESS NETWORK

(75) Inventors: Michelle X. Gong, Sunnyvale, CA (US); Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 466 days.

This patent is subject to a terminal disclaimer.

(21) Appl. No.: 13/405,905

(22) Filed: Feb. 27, 2012

(65) Prior Publication Data

US 2012/0155357 A1  Jun. 21, 2012

Related U.S. Application Data

(63) Continuation of application No. 12/384,638, filed on Apr. 7, 2009, now Pat. No. 8,149,750.

(51) Int. Cl.
*G08C 17/00* (2006.01)
*H04M 1/725* (2006.01)
*H04W 52/02* (2009.01)

(52) U.S. Cl.
CPC ........ *H04M 1/7253* (2013.01); *H04W 52/0261* (2013.01); *Y02B 60/50* (2013.01)

(58) Field of Classification Search
CPC . H04W 52/02; H04W 52/0203; H04W 84/12; H04W 52/46; H04W 52/0261; H04B 7/18543; H04M 1/7253; Y02B 60/50
USPC .................................................. 370/311, 318
See application file for complete search history.

(56) References Cited

U.S. PATENT DOCUMENTS

| 8,149,750 B2 * | 4/2012 | Gong et al. ................... 370/311 |
| 2008/0069021 A1 | 3/2008 | Chhabra |
| 2008/0170116 A1 | 7/2008 | Nishibayashi et al. |
| 2009/0196212 A1 * | 8/2009 | Wentink ........................ 370/311 |

* cited by examiner

*Primary Examiner* — Brenda H Pham
(74) *Attorney, Agent, or Firm* — Sutherland Asbill & Brennan LLP

(57) ABSTRACT

In various embodiments of the invention, a device in a wireless communications network may negotiate with a network controller to determine when the device may enter a power save mode. The power save mode may include period(s) in which the device is in a low power state in which it cannot transmit or receive, and period(s) in which it is in an operational state in which it can transmit and/or receive.

14 Claims, 4 Drawing Sheets

| OCTETS: | 1 | 1 | 1 | 2 |
|---|---|---|---|---|
| FIELD: | CATEGORY | ACTION | POWER MANAGEMENT | TIME PERIOD |

FIG. 3A

| OCTETS: | 1 | 1 | 1 | 2 |
|---|---|---|---|---|
| FIELD: | CATEGORY | ACTION | STATUS | TIME PERIOD |

FIG. 3B

DEVICE POWER MANAGEMENT IN A WIRELESS NETWORK

PRIORITY

The present application is a Continuation of U.S. application Ser. No. 12/384,638 filed on Apr. 7, 2009 to Michelle X. Gong, et al. which is incorporated herein by reference in its entirety and to which priority is also hereby claimed.

BACKGROUND

Portable battery powered wireless communications devices have adopted various approaches to conserve battery power during their operation. Since the operation of these devices is complex, the power management schemes tend to also be complex. Many of these approaches are efficient under some network conditions but inefficient during other network conditions. For example, the power management schemes described in the industry standard IEEE 802.15.3 may require the network controller to terminate all communication streams associated with a device before going into a low power mode. This restriction may limit how often the device can feasibly go into the low power mode, or may cause added complication due to the need to restart the communication streams frequently.

BRIEF DESCRIPTION OF THE DRAWINGS

Some embodiments of the invention may be understood by referring to the following description and accompanying drawings that are used to illustrate embodiments of the invention. In the drawings:

FIG. 3A, 3B show a format for requesting a time period to be in a power save mode, and a format for responding to the request, according to an embodiment of the invention.

DETAILED DESCRIPTION

Figure 1:
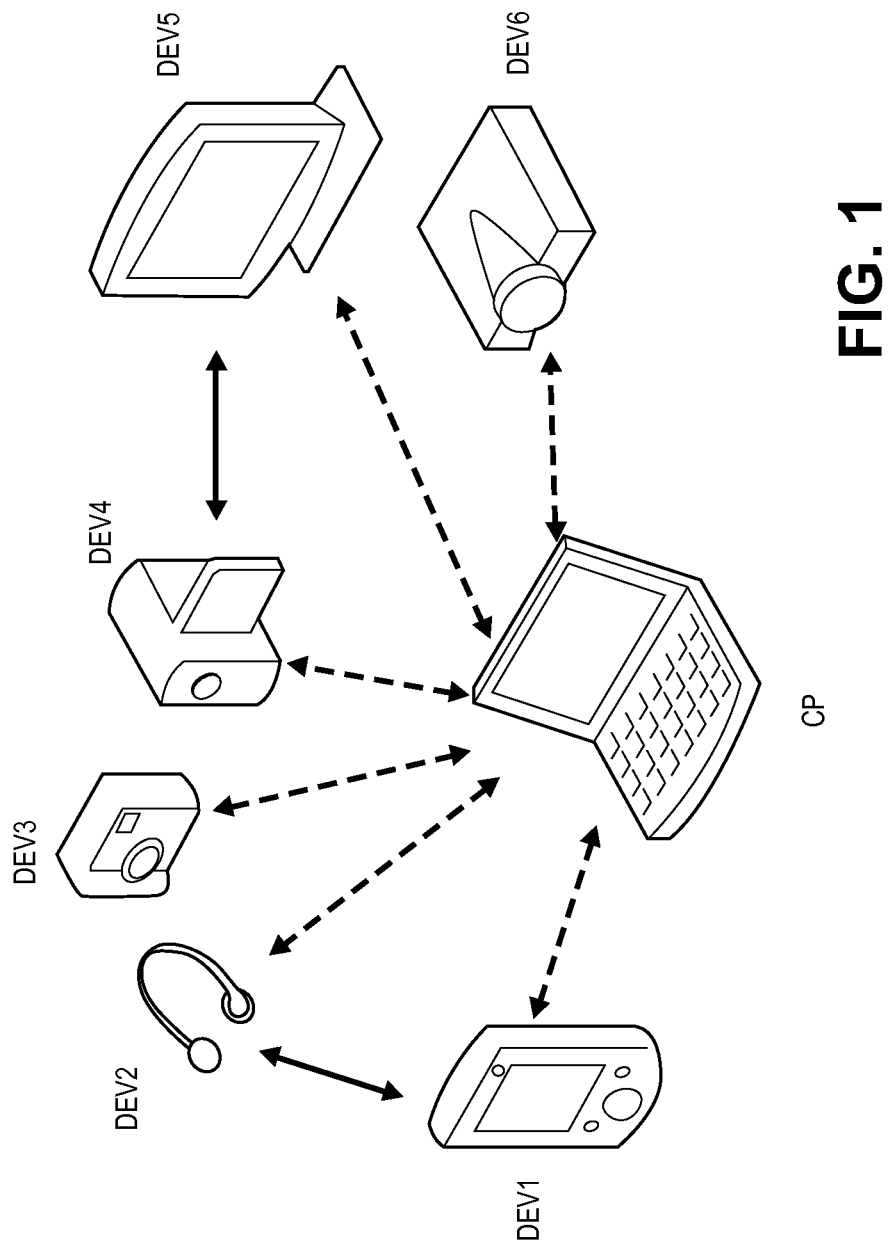
FIG. 1 shows devices in a wireless communications network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not.

For convenience of reference within this document, a network controller may be referred to as a central point (CP), each of the other network devices may be referred to as a DEV, and a periodic block of communication protocol may be referred to as a superframe, as this terminology is already common in some types of personal area networks. However, these terms are intended to be used as examples only. The use of these terms in this document should not be construed as limiting the embodiments of the invention to devices that are labeled as CP or DEV, or to superframe protocols, unless those limitations are specifically claimed. Other terms and acronyms may also be used as examples, without limiting the scope of the claims to implementations that use those terms and/or acronyms, unless specified in the claims.

In various embodiments, a DEV in a wireless network may have at least two power modes, designated herein as an active mode, in which the device is in an awake state at all times that are not allocated exclusively to other DEV's, and a power save (PS) mode, in which the DEV is placed in a non-operational low-power condition during scheduled times known to both the DEV itself and to the network controller. The PS mode may include at least two states, a doze state in which the DEV cannot transmit or receive and power usage is conserved in ways compatible with that state, and an awake state in which the DEV is able to transmit and/or receive and is powered sufficiently to permit such transmissions and/or receptions. In some embodiments the DEV may be in the awake state during specific times while in the power save mode, such as but not limited to:

during the beacon time;
during the announcement time;
times scheduled during the beacon time or announcement time for communications involving the DEV; and
during at least part of a contention based access time if the DEV has data queued up for transmission.

In some embodiments the DEV may remain in the doze state during some of these times, depending on various criteria (e.g., it may wake up for every third beacon rather than every beacon).

Low power consumption may be achieved in various ways, such as but not limited to one or more of: 1) stopping the operating clock signal to various circuits, 2) slowing the frequency of the clock signal to various circuits, 3) lowering the operating voltage in various circuits, 4) removing the operating voltage to various circuits, 5) any combination of these or other techniques, 5) etc.

In some embodiments, the responsibilities of a network controller (e.g., the right to schedule overall network operations with various devices) may be transferred from one device to another. This may be especially true in ad hoc networks, which are created, modified, and dissolved as various devices move into or out of the network. For the purposes of this document, a network controller is the device that has the responsibilities of a network controller at the time the other described actions are taking place.

FIG. 1 shows devices in a wireless communications network, according to an embodiment of the invention. Each device may be assumed to contain at least one processor and at least one radio to facilitate the described wireless communications. The illustrated embodiment shows a notebook computer as a network controller (the central point CP), and various other devices as the non-controller network devices (DEV1-DEV6) whose communications are largely scheduled by the CP. Although specific types of devices are shown (e.g., display, camera, headphones, etc.), these are used only as examples. Any types of devices that perform the described communications functions may be used instead. Each of the DEV's may communicate directly with the CP as shown. In some instances, some of the DEV's may also communicate directly with each other. Some or all of the DEV's may operate according to the operational descriptions described herein. In some embodiments each of the DEV's (and possibly the CP) that operates according to the operational descriptions herein may be powered by a battery, since conservation of power is especially important in battery-powered devices, but the operations described might also be used in devices that plug into an external power source.

Figure 2:
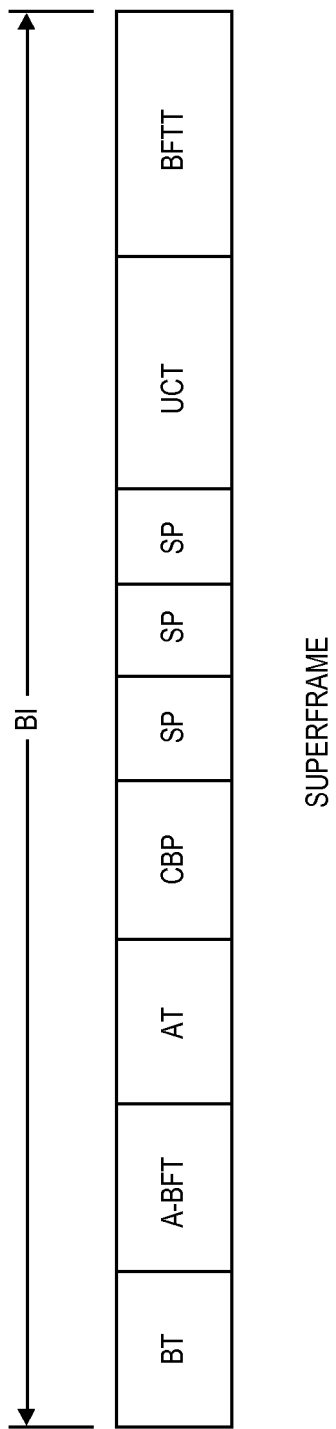
FIG. 2 shows a format for a superframe, according to an embodiment of the invention.

FIG. 2 shows a format for a superframe, according to an embodiment of the invention. Such superframes may be repeated over and over at regular intervals. The illustrated embodiment shows specific time periods, with specific labels and devoted to specific purposes, that occur in the superframe, but other embodiments may use more, fewer, and/or different time periods, with different labels and/or purposes. In the embodiment shown, a beacon time (BT) is at the beginning of the frame. A beacon may be transmitted by the CP, generally omnidirectionally, for reception by the other devices in the surrounding area. A beacon may contain various information, such as but not limited to 1) identifying information about the CP, 2) a timing synchronization signal for the DEV's to synchronize their network clocks, 3) general scheduling information about when subsequent portions of the superframe will occur, 4) etc. The beacon may be followed by a period for association beam forming training (A-BFT), during which devices that are joining the network may perform antenna training so that they may use directional communications. During the Announcement Time (AT), the CP may poll various devices in the network, and may schedule communications between specific devices for later in the superframe.

The Contention Based Period (CBP) may be used by various devices in the network to communicate at times that were not previously scheduled. In some embodiments, the devices may compete for use of the communications medium by trying to transmit if they detect that the medium is not already busy. Various approaches may be used to recover in case of collisions (caused when two devices try to transmit at the same time and thereby interfere with each other). Devices wishing to join the network may use the CBP to establish initial contact with the CP. Service Periods are times that were prescheduled (e.g., during the BT and/or AT) for specific devices to communicate at specific times in a non-interfering manner. In some embodiments, each SP is devoted to communications between a specific device pair.

If time is left over in the superframe after the SP's, that time may be indicated as Unallocated Channel Time (UCT), during which no communications, either scheduled or unscheduled, is to take place. At the end of the superframe, the beam forming training time (BFTT) period allows devices that are already in the network to perform antenna retraining. This may be useful if a device is physically moved, thereby requiring different parameters for directional communications. The entire time period for the superframe is shown as a Beacon Interval (BI), which may define the repetition rate of the superframes.

FIG. 3A, 3B show a format for requesting a time period to be in a power save mode, and a format for responding to the request, according to an embodiment of the invention. FIG. 3A shows a format for a DEV to request a time to place itself in a power save mode, while FIG. 3B shows a format for a CP to respond to the request. Other embodiments may use other formats to convey the needed information. In the illustrated embodiment of FIG. 3A, four fields are shown, which may be incorporated into a transmission at an acceptable point, such as but not limited to being in an information element (IE). A suggested size of each field is shown in octets (8 bits each), but other sizes may also be used for any field. The Category field may be used to distinguish this type of IE from other types of IEs (for example, Power Management might represent one type of IE), while the Action field may be used as a sub-category within each type of category. Allocating 8 bits to each field may permit up to 256 types of IE's, with up to 256 sub-categories for each type of IE.

Within the scope of the designated Category and Action values, the Power Management field may be used, among other things, to indicate that this is a request for the transmitting device to enter the power save mode. For example, a particular value in one or more particular bits of this field may indicate a request to enter the power save mode, while a different particular value in those bits may indicate that the transmitting device has exited the power save mode prematurely. Other values, meanings, and bit assignments may be used to convey the necessary information. In some embodiments, the Time Period field may be used to indicate the time period that the device is to be in the power save mode. A particular value in this field may indicate that a predetermined time period is understood, and therefore does not need to be specified.

This time period may be expressed in various ways, such as but not limited to: 1) The time period will cover the number of units of time specified in this field. The duration of each unit of time (such as a microsecond, or a superframe) may be predetermined and understood by both devices, or indicated in the request. 2) The start time for the time period may be indicated in this field. Alternately, the start time may be predetermined and understood, such as assuming that the time period will start at a particular point in a superframe. 3) A repeating Power Save cycle may be indicated in this field. For example, the device may enter the power save mode at a particular point in the current superframe, and wake up long enough to listen to each BT and/or AT in subsequent superframes. If a beacon or announcement indicates that the device needs to communicate, the device may exit the power save mode to perform that communication.

The illustrated embodiment of FIG. 3B shows a format for responding to the request of FIG. 3A, and also shows four fields. The Category and Action fields may indicate that this is a response to the request. The Status field may indicate the CP's acceptance or rejection of the request to be in a power save mode during the indicated time period. If the request is accepted (e.g., by setting a particular value in the Status field), the CP may subsequently refrain from scheduling communications for the indicated DEV during that time period. If the request is rejected (e.g., by setting a different particular value in the Status field), the CP may suggest an alternate time period that would be acceptable to it by indicating that alternate time period in the Time Period field. If this alternate time period is acceptable to the DEV, then it may transmit another request as shown in FIG. 3A, but using the alternate value in the Time Period field. If the CP accepts this alternate request, the DEV may go into the power save mode during the indicated alternate time period.

Figure 4:
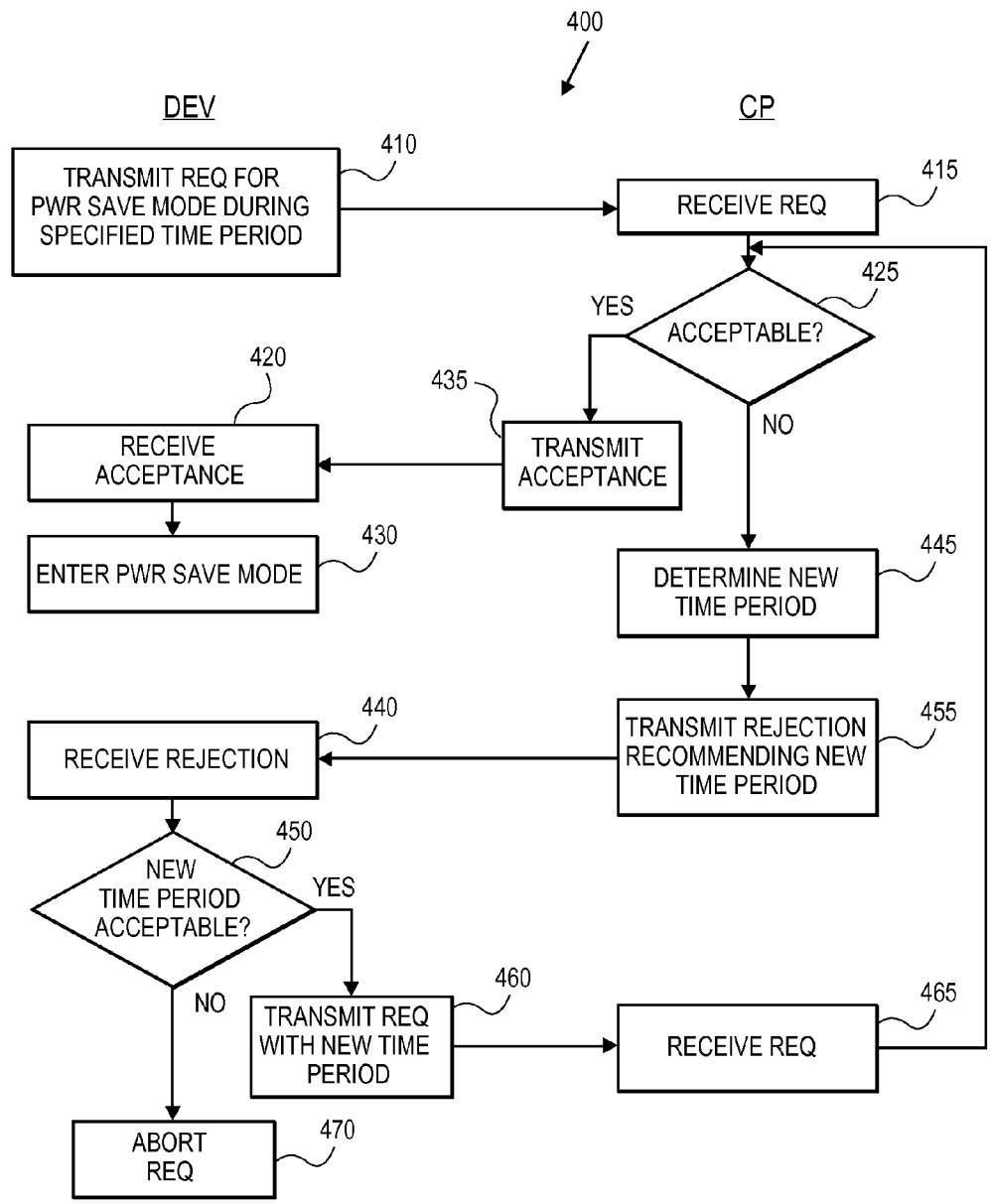
FIG. 4 shows a flow diagram of a method of negotiating a time for a power save mode, according to an embodiment of the invention.

FIG. 4 shows a flow diagram of a method of negotiating a time for a power save mode, according to an embodiment of the invention. In flow diagram 400, at 410 a DEV may transmit a request to enter a power save mode during a particular time period. As previously described, the time period may be expressed in various ways, and may include conditions for entry/exit from a non-operating low power state. A CP may receive that request at 415 and determine at 425 whether the time period is acceptable. Various considerations may be used to determine the acceptability of this time period, such as but not limited to whether the CP has data to transmit to the DEV during that time period. If the requested time period for the power save mode is acceptable, the CP may transmit an acceptance to the DEV at 435, the DEV may receive that acceptance at 420, and at 430 the DEV may enter the power save mode for the agreed-upon time period.

However, if the CP determines at 425 that the time period is not acceptable to it, at 445 it may determine a different time period that is acceptable to it. At 455 it may then transmit a rejection of the request, and may include a recommendation for this different time period. (In some instances, it may transmit a rejection without a recommended time period, which may terminate the negotiation session.) At 440 the DEV may receive the response containing the rejection, and at 450 may decide if the new time period recommended by the CP is acceptable to the DEV. If not, the DEV may either abort the negotiation session at 470 (shown), or may derive its own new time period and return to 410 to transmit a new request with this newly-derived time period (not shown).

However, if the recommended time period from the CP is acceptable, as determined at 450, the DEV may transmit a new request at 460 containing this recommended time period. The CP may receive the request at 465, and determine the acceptability of this time period at 425. From this point on, the flow may follow the same operations as previously described for 425 and beyond. (Although the CP recommended this new time period, and would presumably accept it, conditions may have changed since that recommendation was made, and therefore the CP gets another chance to accept or reject it at 425). In theory, this loop could continue indefinitely with new time periods being proposed. To prevent this potentially wasteful continuous loop, one or both of the CP and DEV may abort the process after a certain amount of time has elapsed or a certain number of time periods have been proposed without acceptance.

The procedures described herein have a number of advantages over conventional approaches to reducing power consumption in a DEV, especially the flexibility permitted by these procedures. The negotiation procedure between the CP and the DEV permits the DEV to exercise some control over its own power saving schedule, but also allows the CP to recommend a schedule that will facilitate other communications for which it is responsible (e.g., multicast messages from the CP to multiple DEVs, or peer-to-peer communications directly between two DEVs). On the other hand, if one DEV wants to communicate with another DEV through the intermediary CP, the two DEVs can be on separate power save schedules that maximize their individual power savings, while the CP can buffer the communications between the two DEVs.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus, comprising:
a first wireless communications device comprising a radio configured to establish wireless communications in a wireless communications network by negotiating, with a second wireless communications device, a time period for the first wireless communications device to operate in a power save mode, the negotiation comprising:
transmitting, to the second wireless communications device, a request for the first wireless communications device to enter the power save mode;
receiving, from the second wireless communications device, a recommended time period for the power save mode;
transmitting, to the second wireless communications device, a request for acceptance of the recommended time period; and
receiving, from the second wireless communications device, the acceptance of the recommended time period.

2. The apparatus of claim 1, wherein the request for acceptance comprises a first information element and the acceptance comprises a second information element.

3. The apparatus of claim 2, wherein the first information element comprises a field to indicate a duration of the power save mode.

4. The apparatus of claim 1, wherein the first wireless communications device is configured to be in an awake state during at least a portion of the power save mode during:
at least one beacon time;
at least one announcement time;
times scheduled during the beacon time for communications involving the first wireless communications device; and
during at least part of a contention based access time if the first wireless communications device has data queued up for transmission.

5. The apparatus of claim 1, wherein the second wireless communications device refrains from scheduling any communications for the first wireless communications device during the recommended time period.

6. An apparatus, comprising:
a first wireless communications device comprising a radio configured to establish wireless communications in a wireless communications network by negotiating, with a second wireless communications device, a time period for the second wireless communications device to operate in a power save mode, the negotiation comprising:
- receiving a request to enter the power save mode from the second wireless communications device;
- transmitting, to the second wireless communications device, a recommended time period for the power save mode;
- receiving, from the second wireless communications device, a request for the second wireless communications device to operate in the power save mode during the recommended time period; and
- transmitting, to the second wireless communications device, an acceptance of the request for the recommended time period.

7. A method, comprising:
negotiating a time period for a first wireless communications device to operate in a power save mode, wherein the power save mode comprises:
- an awake state in which sufficient power is provided to permit transmitting and receiving; and
- a doze state in which less power is consumed than in the awake state, wherein the negotiation comprises:
  - transmitting, to a second wireless communications device, a request for the first wireless communications device to enter the power save mode;
  - receiving, from the second wireless communications device, a recommended time period for the power save mode;
  - transmitting, to the second wireless communications device, a request for acceptance of the recommended time period; and
  - receiving, from the second wireless communications device, the acceptance of the recommended time period.

8. The method of claim 7, wherein transmitting and receiving are not permitted during the doze state.

9. The method of claim 7, wherein the second wireless communications device refrains from scheduling any communications for the first wireless communications device during the recommended time period.

10. A method, comprising:
negotiating a time period between a first wireless communications device comprising a radio configured to establish wireless communications with a second wireless communications device for the second wireless communication device to operate in a power save mode, wherein the power save mode comprises:
- an awake state in which sufficient power is provided to permit transmitting and receiving; and
- a doze state in which less power is consumed than in the awake state, wherein the negotiation comprises:
  - receiving a request to enter the power save mode from the second wireless communications device;
  - transmitting, to the second wireless communications device, a recommended time period for the power save mode;
  - receiving, from the second wireless communications device, a request for the second wireless communications device to operate in the power save mode during the recommended time period; and
  - transmitting, to the second wireless communications device, an acceptance of the request for the recommended time period.

11. An article comprising a non-transitory computer-readable storage medium that contains instructions, which when executed by one or more processors result in performing operations comprising:
negotiating a time period for a first wireless communications device to operate in a power save mode, wherein the power save mode comprises:
- an awake state in which sufficient power is provided to permit transmitting and receiving; and
- a doze state in which less power is consumed than in the awake state, wherein the negotiation comprises:
  - transmitting, to a second wireless communications device, a request for the first wireless communications device to enter the power save mode;
  - receiving, from the second wireless communications device, a recommended time period for the power save mode;
  - transmitting, to the second wireless communications device, a request for acceptance of the recommended time period; and
  - receiving, from the second wireless communications device, the acceptance of the recommended time period.

12. The article of claim 11, wherein the second wireless communications device refrains from scheduling any communications for the first wireless communications device during the recommended time period.

13. The article of claim 11, the negotiating further comprising the first wireless communications device, the second wireless communications device, or both being in the awake state during the power save mode during:
- at least one beacon time;
- at least one announcement time;
- times scheduled during the beacon time for communications involving the first wireless communications device; and
- during at least part of a contention based access time if the first wireless communications device has data queued up for transmission.

14. An article comprising a non-transitory computer-readable storage medium that contains instructions, which when executed by one or more processors result in performing operations comprising:
negotiating a time period between a first wireless communications device comprising a radio configured to establish wireless communications with a second wireless communications device for the second wireless communication device to operate in a power save mode, wherein the power save mode comprises:
- an awake state in which transmitting and receiving is permitted; and
- a doze state in which less power is consumed than in the awake state, wherein the negotiating comprises:
  - receiving a request to enter the power save mode from the second wireless communications device;
  - transmitting, to the second wireless communications device, a recommended time period for the power save mode;
  - receiving, from the second wireless communications device, a request for the second wireless communications device to operate in the power save mode during the recommended time period; and
  - transmitting, to the second wireless communications device, an acceptance of the request for the recommended time period.

* * * * *